W. R. COMINGS.
CLOSURE.
APPLICATION FILED FEB. 6, 1907. RENEWED SEPT. 14, 1908.
905,652.
Patented Dec. 1, 1908.
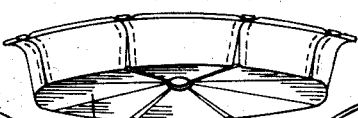
Fig. 1.
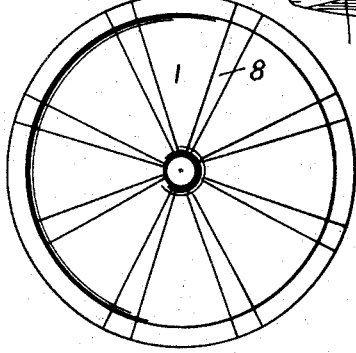
Fig. 2.
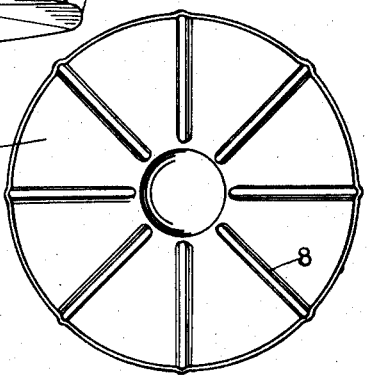
Fig. 7.
Fig. 3.
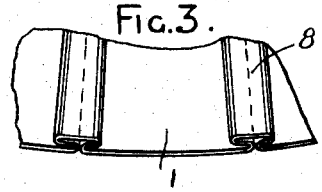
Fig. 4.
Fig. 5.
Fig. 8.
Fig. 9.
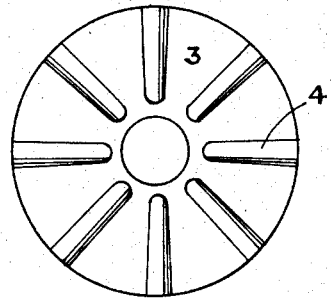
Fig. 6.
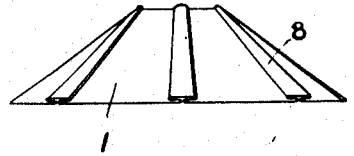
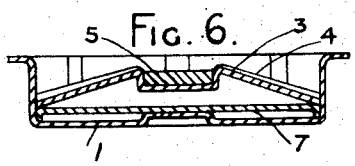
Fig. 10.
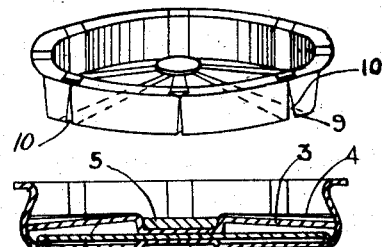
Fig. 11.
Witnesses:
Edwin L. Yewell
R. W. Bishop
Inventor:
William R. Comings
by Percy B. Hills
Atty

UNITED STATES PATENT OFFICE.

WILLIAM RIGHTER COMINGS, OF WIMBLEDON PARK, ENGLAND.

CLOSURE.

No. 905,652.  Specification of Letters Patent.  Patented Dec. 1, 1908.

Application filed February 6, 1907, Serial No. 356,061. Renewed September 14, 1908. Serial No. 452,932.

*To all whom it may concern:*

Be it known that I, WILLIAM RIGHTER COMINGS, mechanical engineer, citizen of the United States, residing at Wimbledon Park, in the county of Surrey, England, have invented certain new and useful Improvements in Closures, of which the following is a specification.

According to this invention it is proposed to make expanding and contracting articles by means of plaited folds formed on dished disks or other shaped material, whereby a wide range of elasticity is imparted to comparatively inelastic material, so that the articles formed in this way are capable of a large amount of expansion and contraction. In order to take advantage of these properties to the fullest extent I use with the articles so made, a similar but stiffer dished disk. This disk when inverted and placed inside the plaited article will expand and contract in unison with it according to the pressure applied. It will thus act as a distender, and when pressed down can be locked in that position and so maintain the article in an expanded condition.

Articles as described may be made from a large range of materials such as metal, celluloid, paper, gelatin, parchment, rubber and other substances, or with two or more such materials combined, and may be usefully applied on account of their elastic action to such purposes as stoppers, man hole, barrel, and other covers, lids and closures, and for a variety of other purposes.

In order that my invention may be clearly understood I will describe one application of the same by reference to the accompanying drawing in which:—

Figure 1 is a perspective view of a stopper formed from a dished disk. Fig. 2 is a plan of the same. Fig. 3 is an enlarged view of the elastic plaits before being flattened. Fig. 4 is a view of a dished disk or distender with folds or corrugations. Fig. 5 is a plan of the same. Fig. 6 is a section of a stopper before being expanded. Fig. 7 is a plan of a dished disk for forming into a stopper. Fig. 8 is a side view of the same. Fig. 9 shows the same with flattened down folds. Fig. 10 is a perspective view of an elastic expansible and contractible dished disk fully formed. Fig. 11 is a section of the stopper shown in Fig. 6 but expanded by the distender, which is shown pressed down to its fullest extent.

In carrying out my invention in the form illustrated I first impress a disk 1 of cardboard or other material, Fig. 7, with corrugations 8, which causes the material to be drawn up into a dish shaped form, Fig. 8. The corrugations in the next stage are formed into plaits, shown enlarged in Fig. 3, and flattened down as in Fig. 9, when thus formed the article will be found to possess elastic properties which may be applied in practice to various purposes, or it may be further operated upon in suitable dies to produce a dished disk with rim or flange, Fig. 10.

Figs. 1 and 10 show a stopper formed as described with the plaits carried to the center. In this form it may be used as a simple elastic cork like stopper, or by using another dished disk, or distender 3 having corrugations 4, as shown in Fig. 4, inside the body of the stopper, it may be expanded as shown in Fig. 11, pressure being applied to the top of the distender 3 by hand or mechanical means.

In order that the stopper may be expanded in any particular part a stop or platform 7 of the required height Fig. 6 is placed in the bottom, and to enable this to be done, I employ comparatively loose folds where most expansion is required, and bring said folds together by pressure where required to be less elastic, as shown at 10.

To render the distender 3 extra stiff I fill the top recess with a plug 5 shown in Fig. 6. Used alone these distenders form useful springs and may be applied to prevent shock to fragile articles by interposing them between the articles and the sides of the case in which they may be carried.

Articles constructed by this method may be conveniently formed in suitable dies adapted, first to crease or corrugate the material then to fold the corrugations and flatten them thus forming elastic plaits preferably of the box plait type.

Having now particularly described and ascertained the nature of this invention and in what manner the same is to be performed I declare that what I claim is:—

1. A closure, having its body portion formed in radial folds or plaits extending to its edge, said folds or plaits being flattened down.

2. A closure, formed from a circular piece of material having its edges upturned annularly and having its body portion formed in radial folds or plaits that extend through said upturned portion.

3. A closure, formed from a circular piece of material having its edge upturned annularly and formed in radial folds or plaits extending through said upturned portion, said folds or plaits being flattened down.

4. A closure, embodying a body portion having its edge upturned annularly, and an elastic expansible distender adapted to fit into said body portion to expand the latter annularly.

5. A closure, embodying a body portion having its edge upturned annularly, and an elastic dished expansible distender adapted to fit into said body portion to expand the latter annularly.

6. In a closure, the combination with a body portion formed in radial folds or plaits, of a distender adapted to fit into said body portion to expand the latter annularly.

7. In a closure, the combination with a body portion formed in radial folds or plaits, of a dished distender adapted to fit into said body portion to expand the latter annularly.

8. In a closure, the combination with a body portion formed from a circular piece of material having its edge upturned annularly and formed in radial folds or plaits extending through said upturned portion, of a dished distender adapted to fit within said upturned portion to expand the latter annularly.

9. In a closure, the combination with a body portion formed in radial folds or plaits, of a dished distender formed in radial corrugations and adapted to fit into said body portion to expand the latter annularly.

10. In a closure, the combination with a body portion formed from a circular piece of material having its edge upturned annularly and formed in radial folds or plaits extending through said upturned portion, of a dished distender formed in radial corrugations and adapted to fit within said upturned portion to expand the latter annularly.

11. In a closure, the combination of a body portion formed from a circular piece of material having its edge upturned annularly and formed in radial folds or plaits extending through said upturned portion, a dished distender adapted to fit within said upturned portion to expand the latter annularly, and a stop within said upturned portion to position said distender.

12. A distender for closures, formed of a circular piece of material having radial corrugations therein causing said distender to assume a dished shape.

13. A distender for closures, formed of a circular piece of material having radial corrugations therein causing said distender to assume a dished shape, said corrugations being flattened into folds or plaits.

14. A distender for closures, formed of a circular piece of material recessed at its center and having radial corrugations extending from said recess, whereby said distender is caused to assume a dished shape.

15. A distender for closures, formed of a circular piece of material recessed at its center, having radial corrugations extending from said recess, whereby said distender is caused to assume a dished shape, and having a stiffening plug fitted into said recess.

16. A closure formed from a circular piece of material having its edges upturned annularly and formed in radial folds or plaits extending through said upturned portion, said folds or plaits in said upturned portion being spread apart at one portion, and brought together at another portion.

17. In a closure, the combination with a body portion having an annular upturned edge, of a dished distender formed in radial folds or plaits and adapted to be flattened within said body portion to expand its annular upturned edge.

In testimony whereof I have signed my name to this specification in the presence of two subscribing witnesses.

WILLIAM RIGHTER COMINGS.

Witnesses:
H. D. JAMESON,
F. L. RAND.